(12) United States Patent
Lépinay et al.

(10) Patent No.: US 12,247,936 B2
(45) Date of Patent: Mar. 11, 2025

(54) ATMOSPHERIC DISTILLATION APPARATUS AND METHOD

(71) Applicant: AD Systems S.A.S., Saint André sur Orne (FR)

(72) Inventors: Martial Lépinay, Mouen (FR); Bruno Galliot, Seulline (FR)

(73) Assignee: AD SYSTEMS S.A.S., Saint André sur Orne (FR)

( * ) Notice: Subject to any disclaimer, the term of this patent is extended or adjusted under 35 U.S.C. 154(b) by 35 days.

(21) Appl. No.: 18/052,630

(22) Filed: Nov. 4, 2022

(65) Prior Publication Data

US 2023/0100425 A1  Mar. 30, 2023

Related U.S. Application Data

(60) Provisional application No. 63/247,445, filed on Sep. 23, 2021.

(51) Int. Cl.
| | |
|---|---|
| *B01D 3/42* | (2006.01) |
| *B01D 1/00* | (2006.01) |
| *B01L 3/00* | (2006.01) |
| *G01N 25/14* | (2006.01) |
| *G06T 7/00* | (2017.01) |
| *H04N 23/90* | (2023.01) |

(52) U.S. Cl.
CPC ........... *G01N 25/14* (2013.01); *B01D 1/0082* (2013.01); *B01D 3/42* (2013.01); *G01N 25/145* (2013.01); *G06T 7/0002* (2013.01); *H04N 23/90* (2023.01); *B01L 3/569* (2013.01)

(58) Field of Classification Search
None
See application file for complete search history.

(56) References Cited

U.S. PATENT DOCUMENTS

| | | | |
|---|---|---|---|
| 6,620,620 B1 * | 9/2003 | Anderson | G01N 1/40 |
| | | | 422/106 |
| 8,372,247 B2 | 2/2013 | Urvantsau et al. | |
| 8,448,510 B2 | 5/2013 | Scheiner et al. | |

(Continued)

FOREIGN PATENT DOCUMENTS

| | | | | |
|---|---|---|---|---|
| BR | 102015015254 A2 * | 5/2018 | | B01D 3/42 |
| CN | 108421272 A | 8/2018 | | |

(Continued)

OTHER PUBLICATIONS

"Mini LED Light Box", belart.com, Nov. 28, 2020 (date obtained from Wayback Machine), https://www.belart.com/mini-led-light-box.html.*

(Continued)

*Primary Examiner* — Jonathan Luke Pilcher
(74) *Attorney, Agent, or Firm* — Vorys, Sater, Seymour and Pease LLP (57) ABSTRACT

A system and method for distillation testing of a liquid sample at atmospheric pressure for the improved prediction of the heating necessary to reach the initial boiling point (IBP) and ensure the IBP is observed within certain time constraints, and regardless of sample composition. This monitors the sample by the camera during different heating phases of the test to obtain visual images of the sample and a computer analyzes image data observed to regulate the optimal distillation process.

19 Claims, 7 Drawing Sheets

(56) References Cited

U.S. PATENT DOCUMENTS

| | | | |
|---|---|---|---|
| 8,518,130 | B2 | 8/2013 | Croft et al. |
| 10,363,495 | B2 | 6/2019 | Urvantsau et al. |
| 11,021,669 | B2 | 6/2021 | China |
| 11,504,643 | B2* | 11/2022 | Baier ............ B01D 3/085 |
| 2009/0165653 | A1* | 7/2009 | Torii ............ B01D 3/085 |
| | | | 96/174 |
| 2012/0290223 | A1 | 11/2012 | Mertens |
| 2014/0278141 | A1 | 9/2014 | Mertens |
| 2016/0008733 | A1* | 1/2016 | Wu ............ B01D 3/085 |
| | | | 202/238 |
| 2017/0038295 | A1 | 2/2017 | Aizenberg et al. |
| 2018/0036648 | A1* | 2/2018 | Urvantsau ............ C10G 7/12 |
| 2023/0375292 | A1* | 11/2023 | Won ............ F28F 27/00 |

FOREIGN PATENT DOCUMENTS

| | | |
|---|---|---|
| DE | 19803711 A1 | 8/1999 |
| EP | 1967268 A1 | 9/2008 |
| EP | 1967269 A1 | 9/2008 |
| EP | 1972378 B1 | 1/2011 |
| EP | 19672670 B1 | 8/2011 |
| EP | 1967848 B1 | 12/2011 |
| WO | 2018025087 A1 | 2/2018 |

OTHER PUBLICATIONS

Espacenet English langauge translation of DE 19803711 A1.*
PE2E English langauge translation of BR 102015015254 A2.*
Written Opinion of the International Preliminary Examining Authority mailed Aug. 24, 2023 for PCT/IB2022/060981 filed Nov. 15, 2022.
International Search Report and Written Opinion mailed Feb. 16, 2023 for PCT/IB2022/060981 filed Nov. 15, 2022.
ASTM International, "Standard Test Method for Distillation of Petroleum Products and Liquid Fuels at Atmospheric Pressure", Designation D86-20b, Oct. 27, 2020, 29 pages.

* cited by examiner

ATMOSPHERIC DISTILLATION APPARATUS AND METHOD

FIELD OF THE INVENTION

The invention provides an apparatus and method for distillation of liquid fuel or petroleum samples under atmospheric pressure and, more particularly, to an apparatus and method for automatic distillation of such samples at defined conditions.

BACKGROUND

Atmospheric distillation is a method of separating components with differing volatilities from a liquid mixture by heating and condensing a liquid sample. Generally, the process involves heating a defined volume of a sample in a flask to reach the evaporation phase, and then condensing the vapors in a thermostaticially controlled tube and recovering them condensate in a receiver. The foregoing test is carried out under certain conditions.

This atmospheric distillation method may be utilized to determine the boiling range characteristics of petroleum products and liquid fuels. Procedures have been established for testing these characteristics. For example, the American Society of Testing and Materials ("ASTM") issued a standard test method for testing boiling range characteristics of petroleum products and liquid fuels designated as ASTM D86-20b, Standard Test Method for Distillation of Petroleum Products and Liquid Fuels at Atmospheric Pressure ASTM international, West Conshohocken, Pa., 2020, www.astm.org. This is equivalent to other world standards such as ISO3405, IP123, GOST2177, and JIS K2254.

Testing apparatuses have been developed to manually and automatically carry out the ASTM D86 and equivalent test procedures. These testing apparatuses generally include a round bottom flask having a neck portion extending therefrom, a condenser connected to the neck portion of the flask. An opposite end of the condenser is connected to a receiving vessel or collecting flask, and the condenser contains a cooling source, which may generally include a flowing liquid, such as circulating water, but may also include a solid-state cooling device, such as a Peltier device or other comparable thermoelectric cooler, around the condenser to maintain a temperature gradient there through. Heat is applied to the flask to initiate the distillation process and, as the heat increases, the liquid sample begins to boil and vapor begins to rise up to the neck portion of the flask. Once the vapor reaches the cold condenser, the vapor condenses to liquid and rolls down the length of the condenser where it is collected in the receiver.

In particular, these standardized distillation devices generally comprise: a heating element, a distillation flask whose neck can be closed by means of a fluid-tight stopper which is provided with a thermometer which allows the temperature of the evaporated vapors to be measured, and can be connected to a condenser, a collecting cylinder which allows the condensate to be collected and which is provided with means for measuring the quantity of condensate collected in this manner as a function of time, and control and regulation means which allow an operating variable of the heating element to be controlled and varied over time, in particular the temperature or the electrical power of this element in order to obtain distillation parameters, in particular distillation rates and/or times for specific volumes in accordance with a predefined standard.

The standards impose in particular, for a specific group of products, parameters such as the time elapsed between the beginning of heating of the sample and obtaining the initial boiling point IBP, that is to say, the time at which the first drop of condensate is observed in the collecting cylinder, or the time elapsed between the IBP and obtaining the 5% distillation point, that is to say, the point at which 5% of the initial volume of the sample has been collected in the collecting cylinder.

These standards also impose the distillation rate between the 5% distillation point and the point at which there is only 5 ml of sample remaining in the distillation flask (that is to say, the volume of evaporated sample or condensate per unit of time during the distillation) or the time elapsed between the point at which there is only 5 ml of sample remaining in the distillation flask and the final boiling point FBP, that is to say, the end of distillation.

Automatic distillation devices which operate in accordance with these standards currently commercially proposed implement a method according to which: a predefined quantity of a sample to be analyzed (typically 100 ml) is introduced into the distillation flask, the distillation flask is positioned on the heating element, it is closed and connected to the condenser, the sample to be analyzed is classified in a group defined by the standard selected, and the distillation of the sample to be analyzed is initiated, with constant measurement of the quantity of condensate collected in the collecting cylinder, the temperature of the evaporated vapors, and the operating variable of the heating element, in particular the temperature or the electrical power of this element. The values thus measured are transmitted to the control and regulation means which in turn control the operating variable of the heating element to obtain directly and automatically distillation parameters, in particular distillation rates and/or times for specific volumes in accordance with the standard selected. Thus, by automatic distillation is meant that at least the heating is automatically controlled in view of the measured values of the quantity of condensate collected in the collecting cylinder, the temperature of the evaporated vapors, and the operating variable of the heating element, in particular the temperature or the electrical power of this element.

As mentioned, the ASTM D86-20b standard test method is utilizable to measure a number of specific characteristics and/or properties of the petroleum product or liquid fuel sample as defined by this method. Such characteristics and/or properties include the initial boiling point ("IBP"), the 5% distillation point, and the point at which there is only 5 ml of sample remaining in the distillation flask. The IBP is defined as the temperature reading that is observed at the instant the first drop of condensate falls from the lower end of the condenser. The 5% distillation point is the temperature reading at which 5% of the initial volume of the sample has been collected in the collecting receiver.

An important and complex aspect of performing the ASTM Atmospheric distillation test involves managing the heating of the flask to accurately measure the foregoing characteristics and properties of various petroleum products, especially when composition of the product varies due to change in crude source, refining process, blending, or due to contamination. It is also difficult to find appropriate heating of the flask at the start of the test to respect the time between the initial boiling point and the 5% recovered and future maintain specified distillation speed.

Initially, the Atmospheric distillation test procedure was conducted manually. Over time, however, automatic testing apparatuses were developed to facilitate testing and improve accuracy and repeatability. With some of these automatic testing apparatuses, however, the user must determine the initial power applied and the duration, then a second power value which will be applied thereafter until a uniform distillation speed (ml/mn) can be measured and the heating regulation is activated to maintain a correct speed. Values conforming to the standard are rarely obtained on the first test, and this therefore requires repeating the test until conforming values are obtained.

U.S. Pat. No. 8,372,247 (the '247 patent) discloses a prior art automated testing device wherein the temperature of the liquid inside the flask is measured by an external infrared ("IR") sensor. In particular, the '247 patent a distillation device comprising a distillation flask, a condenser connected to the distillation flask, a collecting cylinder connected to the condenser for collecting the distillate, a thermometer for indirect measure of the temperature of a liquid sample present in the distillation flask, a thermometer for direct measurement of the temperature of vapors present in the distillation flask, and a heating element and a controller to control the heating. A single-point measurement (i.e., temperature of the liquid sample) is used to predict the initial heating of unknown product. In the prior art, this prediction of the necessary heating to reach IBP is performed using a non-contacting or external IR sensor to measure the temperature evolution of the liquid in the distillation flask. The prediction of the necessary heating before the 5% distillation point is based on the temperature of the liquid sample in the distillation flask and the temperature of the vapor (measured by a standard vapor thermometer) at the point where the neck of the distillation flask connects to the condenser. However, these predictions may not always be accurate. A dynamic of temperature distributions manifest in the neck portion of the distillation flask after the liquid sample begins to boil and vapor begins to rise in the flask. Information concerning this vapor movement during this time delay or gap (i.e., between when the liquid just begins to boil and when the rising vapor column makes direct contact with the standard vapor thermometer) is currently unmeasurable and, thus, unknown. If ascertained, however, this data (e.g., rate of column vapor movement, evaporation energy of sample) could provide additional considerations in improving the heating regulation, e.g., either increase or decrease the heat, such that the IBP may be observed at an earlier point in time. In other words, additional measurements taken concerning the temperature distribution of the rising column of vapor would improve the predictability of the necessary heating before the IBP and ensure the IBP is observed within the time limitations imposed by the selected standard because adjustments to the heating of the sample can be made sooner (i.e., prior to the vapor making contact with the standard vapor thermometer). The testing apparatus of the '247 patent also contributes to high levels of interference (e.g., internal reflectivity and emissivity) by various components. For example, there is high level of radiation reflected from the interior wall of the collimator of the IR-sensor monitoring the spherical part of the distillation flask. In addition, the base plate for the flask exhibits high emissivity while the IR-target area on the distillation flask exhibits low emissivity. These factors contribute to thermal interference and signal distortion, thus, affecting reproducibility and accuracy of the testing. Moreover, to apply the necessary correction to the heating management such that the test procedure is carried out under conditions that conform with the testing standard, the testing apparatus described in the '247 patent utilizes an algorithm based on a very large database which is deduced from the temperature of the liquid in the flask and the heating power applied initially. However, this results in a correct test the first time around 70-80% of the time U.S. Pat. No. 10,363,495 (the '495 patent) is potentially an improvement of the testing apparatus described in the '247 patent. The '495 patent discloses a prior art automated testing device wherein the temperature of the liquid inside the flask is measured by a first external IR sensor, and further includes a second infrared sensor to indirectly measure the temperature of the vapors just at the start of the glass column of the flask. This technology, however, depends on data collected from numerous tests carried out over the years. As new types of samples evolve and become implemented, and in particular biofuels whose sources are increasingly evolving, such use of the database becomes less relevant. Also, this technology analyzes the rise in temperature of the product as a function of the power applied to the heating element in order to determine the specific heat of the sample to identify its type and, since the heat transfer can be altered between the heating element and the flask (e.g., imperfect positioning of the flask on the support plate), this calculation can be imperfect or erroneous. The boiling temperature is also taken into account (by slowing down the temperature rise) to help determine the type of sample being tested, but if the boiling appears too late in the time slot allowed by the method, there is no longer any possibility of correcting the heating quickly enough.

U.S. Pat. No. 8,448,510 (the '510 patent) discloses yet another prior art automated testing device. The testing device of the '510 patent comprises an optical system which is capable of transmitting at least one infrared beam which is directed horizontally through a measuring cylinder and which cooperates with a linear driving action via a step motor which can be moved in vertical translation in order to allow this beam to be aligned with the meniscus of the condensate collected in this cylinder in order to allow the height of this meniscus to be detected. The optical system of the '510 patent comprises a dual optical barrier fixed to a frame and which is vertically translated/driven via a step motor and a fixed optical barrier. The dual optical barrier has two transmitter receiver pairs that are each capable of transmitting a light beam that is directed horizontally through the measuring cylinder, with one of the pairs transmitting and receiving a center beam centered on the measuring cylinder for detecting lower portion of the meniscus of the condensate collected in the cylinder, and the second of the pairs transmitting and receiving an eccentric beam offset relative to the center beam and passing between the center and the wall of the measure cylinder for detecting the lower portion of the meniscus of the condensate collected in the cylinder.

EP1967268A1 is directed towards a collar for improving contact and communication between the lateral branch of the distillation flask and the condenser. EP1967269B1 is directed towards a device for automatically positioning the heating element relative to the distillation flask.

EP1967270B1 is directed towards a device for automatically aligning and positioning the distillation flask such that it is maintained in proper orientation for conducting the ASTM D86-20b test.

EP1967848B1 is directed towards a system for ensuring proper mounting of the insulating plate between the heating element and the distillation flask.

EP1972378B1 is directed towards a measuring test tube stand utilized in a distillation test incorporating a fluorocarbon resin based seal. However, these developments generally relate to testing set-up rather than data capture during the test as they are unrelated to measurement of the test sample within the flask during the test.

Accordingly, what is needed is an improved system and method for analyzing the test sample within the flask when conducting the ASTM D86-20b test.

SUMMARY

The invention provides a distillation test apparatus and method for automatic distillation of liquid samples at atmospheric pressure that sets up a camera to observe what is happening in the distillation flask. The camera takes visual images. Thus, the camera is not an IR sensor.

The invention controls the flask heating according to the analysis of the images of the camera, in order to obtain a time from first application of heat to an initial boiling point compliant with the standard used, as well as time from initial boiling point time to 5% recovered compliant with the standard used, as well as time recorded from 5 ml residue to the end point compliant with the standard used.

Image analysis can also help in the regulation of the uniform rate of distillation throughout the test (ml/min).

Different phenomena and events of the initial phase of the test when heating is applied can be analyzed and detected on the camera images:

appearance of ripple in the liquid due to the presence of hot liquid flows moving in the flask;
appearance of bubbles on the walls of the flask;
agitation of the liquid surface;
increased liquid level due to dilation;
rise of vapors column and reflux due to condensation on the internal walls of the flask; and/or
arrival of the vapors in the arm of the flask towards the condenser tube.

The invention provides a testing apparatus for distillation of a liquid sample at atmospheric pressure, the testing apparatus comprising:

a flask having a round bottom, a neck portion and a top opening;
a stopper for covering the top opening of the flask;
a heating element in thermal communication with the flask bottom for heating the flask;
a temperature sensor traversing the stopper;
a condenser connected to the flask at one end of the condenser;
a cooling source surrounding the condenser;
a receiver in communication with the condenser for receiving distillate from the condenser;
a sensor for monitoring of a level and/or amount of the distillate collected in the receiver during a distillation test,
a camera positioned to monitor behavior of the liquid sample within the flask to obtain image data of the liquid sample, preferably of the liquid sample and vapors emitted from the liquid sample, during the distillation test, and
an image analysis system to control the heating element based on analysis of the image data.

The invention also provides a method for automatic distillation of a liquid sample at atmospheric pressure using a testing apparatus of the invention, preferably at defined conditions by a standard test method (for example ASTM D86-20b) regardless of composition, the testing apparatus comprising:

a flask having a round bottom, a neck portion and a top opening;
a stopper for covering the top opening of the flask;
a heating element in thermal communication with the flask bottom for heating the flask;
a temperature sensor traversing the stopper;
a condenser connected to the flask at one end of the condenser;
a cooling source surrounding said condenser;
a receiver in communication with the condenser for receiving distillate;
a sensor for monitoring of the level and/or amount of distillate collected in the receiving vessel during a distillation test,
a camera positioned to monitor behavior of the liquid sample within the flask to obtain image data of the liquid sample, preferably to obtain image data of the liquid sample and vapors evaporated from the liquid sample, during a distillation test, and
an image analysis system for analyzing the image data and to control the heating element based on analysis of the image data;
the method comprising the steps of:
selecting a group of products to be analyzed as the liquid sample;
regulating temperatures of the condenser and receiver;
introducing a predefined quantity of the liquid sample to the automatic distillation assembly flask;
initiating testing with an initiating trigger;
heating the flask containing the liquid sample with the heating element;
monitoring behavior of the liquid sample within the flask with the camera to obtain the image data of the liquid sample, preferably of the liquid sample and vapors emitted from the liquid sample, during a distillation test,
analyzing the image data in the image analysis system;
detecting initial boiling of said liquid sample with the image analysis system;
measuring with the temperature sensor the temperature of vapors in the flask;
adjusting the heating by controlling the heating element based on the analyzing of the image data;
measuring a recovered volume of a distillate, produced from the liquid sample, that is received in the receiver; and
stop heating when an end point of the distillation is reached.

BRIEF DESCRIPTION OF THE DRAWINGS

The following figures are included to illustrate certain aspects of the present disclosure, and should not be viewed as exclusive embodiments. The subject matter disclosed is capable of considerable modifications, combinations, and equivalents in form and function, without departing from the scope of this disclosure.

DETAILED DESCRIPTION

Figure 1:
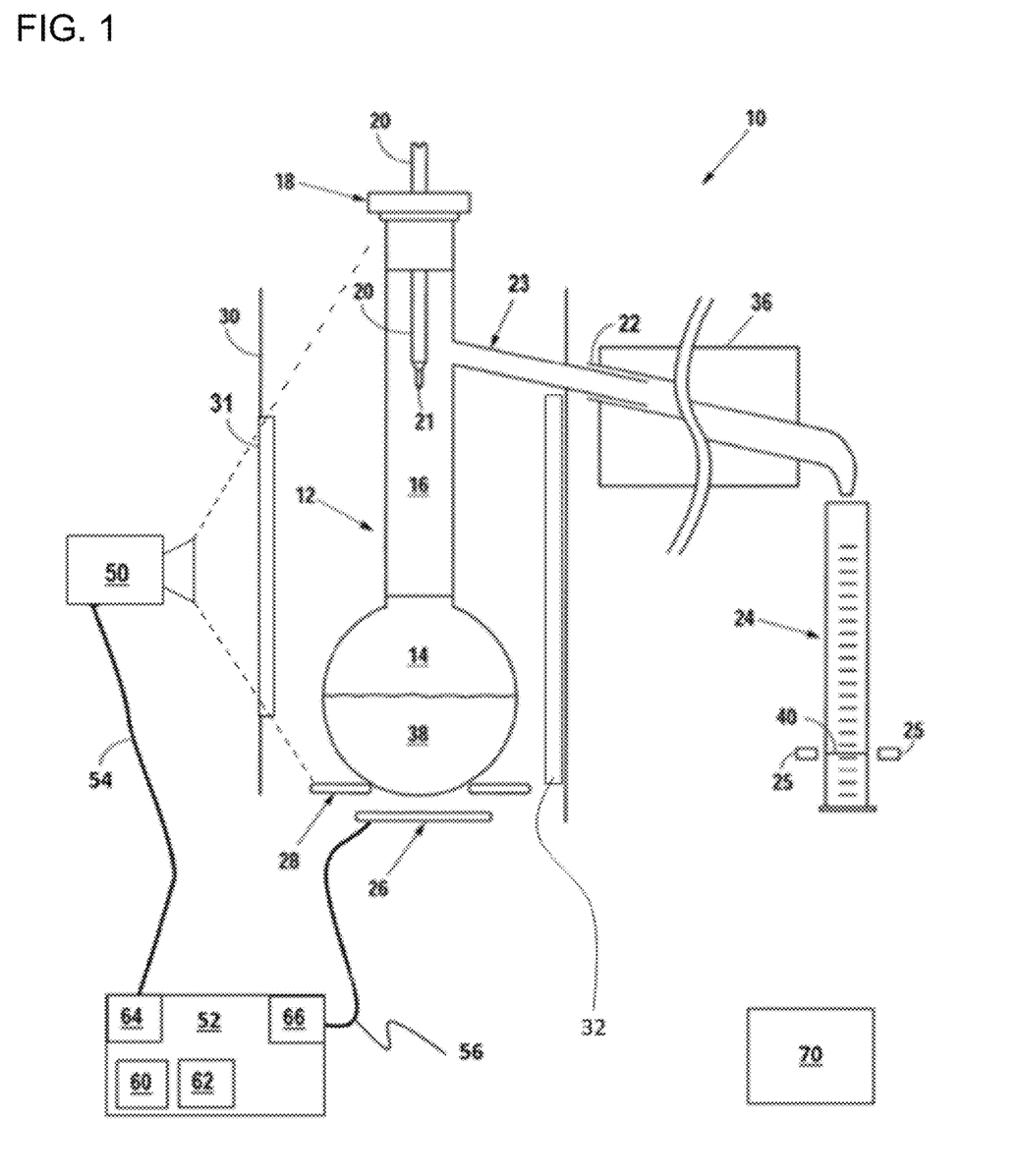
FIG. 1 is a schematic of an example distillation test assembly, according to one or more embodiments of the present disclosure.

FIG. 1 depicts an exemplary distillation assembly 10, according to one or more embodiments of the present disclosure. In the illustrated example, the distillation assembly 10 includes a distillation flask 12 with a stopper 18, a temperature measurement system, for example a thermometer 20, for measuring vapor temperature, a condenser 22, a cooling source 36, a receiver (also known as a receiving vessel, for example a collecting flask or other receiving glassware) 24, a base plate 28 having an opening in which the distillation flask sits, a housing 30, and a heating element 26. In the illustrated example, the distillation flask 12 has a bulb or lower rounded portion 14 configured to contain a liquid fuel sample 38 and a neck portion 16 extending upward from the lower rounded portion 14. The condenser 22 connects to the neck portion 16 of the distillation flask 12 using the flask side tube 23. The stopper 18 forms a seal at the top of the neck portion 16 and thereby seals the distillation flask 12 from the external environment.

As shown, the stopper 18 is provided at an upper end of the neck portion 16 and supports the thermometer 20 such that the thermometer 20 is suspended within the neck portion 16. The thermometer 20 extends through the stopper 18 via an aperture (not shown) in the stopper 18, such that a tip 21 of the thermometer 20 is positioned in the neck portion 16 just below where the side tube 23 connects to the neck portion 16 of the distillation flask 12. The thermometer 20 is mounted through the stopper 18 to mechanically center the thermometer 20 in the neck 16 of the distillation flask 12 without vapor leakage. Non-limiting examples of typical centering devices to mechanically center the thermometer 20 in the neck 16 of the distillation flask 12 are shown in FIGS. 3 and 4 of ASTM D86-20b, incorporated herein by reference in its entirety. The thermometer 20 measures the temperature of the vapor rising from the liquid sample 38 when the vapor comes in direct contact with the tip 21 of the thermometer 20. The cooling source 36 surrounds the condenser 22. Receiver 24 collects a condensate or distillate 40 produced by the distillation process. The thermometer is typically a mercury in glass thermometer or an electronic temperature measurement system.

Typically a barometer 70 is provided which is a pressure measuring device capable of measuring local station pressure with an accuracy of 0.1 kPa (1 mm Hg) or better, at the same elevation relative to sea level as the apparatus in its place of use, e.g., laboratory. The barometer 70 is provided to determine the local atmospheric pressure in which the distillation assembly 10 is employed.

The cooling source 36 may comprise various types of cooling devices, such as a device configured to provide a continuous flow of water or solid-state cooling device. In the illustrated example, the cooling source surrounds the condenser 22 creating a temperature gradient in which accumulated vapor from the distillation flask 12 condenses and rolls down the condenser 22 until the condensate 40 drips into the receiver 24. The receiver 24 may be in various configurations, including cylindrical, and may be graduated to measure the quantity of the distillate 40 collected. In some embodiments, one or more sensors 25 may be utilized to determine amount of the distillate 40 collected in the receiver 24 during the distillation test. The amount of distillate could be a volume or weight amount. The temperature of air surrounding the receiver 24 may be regulated.

In the illustrated example, the distillation assembly 10 is configured to observe the liquid sample 38 within the distillation flask 12 and control the heating of the heating element 26 based on observations of the liquid sample 38 by a camera 50. The camera 50 communicates with an image analysis system including a computer 52 wirelessly or via a wired connection (e.g., an Ethernet cable 54). The computer 52 may include control and regulation means which allow an operating variable of the heating element to be controlled and varied over time, in particular the temperature or the electrical power of this element. Thus, the heating element 26 may communicate with the computer 52 wirelessly or via a wired connection (e.g., an Ethernet cable or other type of cable 56). The computer 52 is configured with a software to receive data (i.e., images of the sample 38) from the camera 52, analyze and interpret such data, and then to control the heating element 26 based on the analyzed and interpreted image data in order to obtain distillation parameters, in particular distillation rates and/or times for specific volumes in accordance with a predefined standard.

As seen in FIG. 1, the computer 52 comprises a microprocessor 60, a memory storage 62, one or more data/signal inputs 64 for example, for receiving signals from the camera 50 (and/or other sensors (not illustrated)), and one or more data/signal outputs 66, for example, for sending control signals to control the heating element 26 to adjust heating of the sample 38. The camera 50 is connected to the computer 52, which has software for analyzing imagery received from camera 50 to determine (measure) and record the sample during the different phases of the test. The camera 50 observes the sample 38 within the flask throughout the entirety of the test, e.g., from the start-up phase of the test throughout distillation of the sample 38. The computer 52 analyzes what is happening to the sample 38 as the heating element 26 applies heat to the sample 38 during the test.

The power required at the start of the test is variable. For example, a few watts may be needed where the test sample is gasoline, whereas up to a few hundred watts may be needed where the test sample is diesel. Thus, the testing procedure may generally comprise applying low-power heating, then gradually increasing the heating, until the appearance of the first phenomena (ripples in the sample 38) detected by analyzing image data from the camera. Then, according to the time remaining to obtain the first drop (IBP) the computer 52 may modulate the heating power to comply with the conditions requested by the applicable standard.

Accordingly, the computer 52 may also be configured to receive data indicative of the level/amount of condensate 40 in the receiver 24. For example, the computer 52 may be in communication with the sensors 25 monitoring the level/amount of condensate 40 in the receiver 24. After the 5% recovery collected in the receiver 24, the heating power of the heating element 26 is managed by the computer 52 to maintain uniform distillation speed (ml/min), i.e., the speed at which the receiver is filled.

The computer 52 is programmed to analyze the image data collected by the camera 50 and may detect phenomena in the test sample 38 based on the differences in successive images supplied by the camera 50. The computer 52 may utilize some numerical filtering to reduce artifacts. Also, areas of images analyzed may be configured as a function of the phenomenon observed.

For example, the computer 52 may identify an appearance of ripple in the liquid due to the presence of hot liquid flows moving in the flask, by detecting small amounts of differences in the sample by analyzing the successive images despite the successive images appearing very similar due to the relative slowness of the phenomenon.

As to the appearance of bubbles on the walls of the flask 12, the computer 52 may detect variation between images when the first bubbles appears and may then detect when they remain stable for a certain time and how long the bubbles remain "stuck" to the wall of the flask before subsequently rising to the surface.

As to agitation of the sample's liquid surface, the computer 52 may detect variation between images concentrated in the upper area of the sample 38.

As to increased level due to dilation, the computer 52 may detect gradual upward movement of the "agitation of the liquid surface" phenomenon in comparison to prior images.

As to rise of vapors and reflux due to condensation on the internal walls of the flask 12, the computer 52 may detect variation between the images focused in the neck 16 area of the flask 12. Also, it is the reflux phenomenon which is detected (and which can be seen visually) while the vapors may not be visible, and the reflux phenomenon generally takes place at the interface of sample vapor and air above. However, some samples with low boiling temperature (e.g., gasoline or certain solvents) do not have this reflux phenomenon, because the temperature of the flask 12 is not significantly lower than the temperature of the vapors to condense the vapors on its walls. In these instances, a backlight 32 may be provided behind the flask 12 and opposite the camera 50 (i.e., such that the flask 12 is between the camera 50 and the backlight) such that vapor detection may be performed via the computer 52 due to the vapors having a different angle of refraction than the air. When viewing the flask 12, vertical lines may appear and become visible on the edges of the neck 16 of the flask 12 (which is a glass tube) formed by the walls surrounding the flask. In addition, one or more vertical lines (e.g., a black vertical line) may be provided on the back light 32 such that the one or more vertical lines are visible through the neck 16 of the flask 12, in addition to the vertical lines that appear on the edges of the neck 16 mentioned above. When being observed, these vertical lines (on the neck 16 and/or the backlight 32) appear to shift (or become misaligned) in the presence of sample vapors and are no longer aligned with the lines of the "air" area above, and the computer 52 may detect this variation. Thus, the computer 52 can utilize the refractive index change of the medium to detect vapor.

Figure 4:
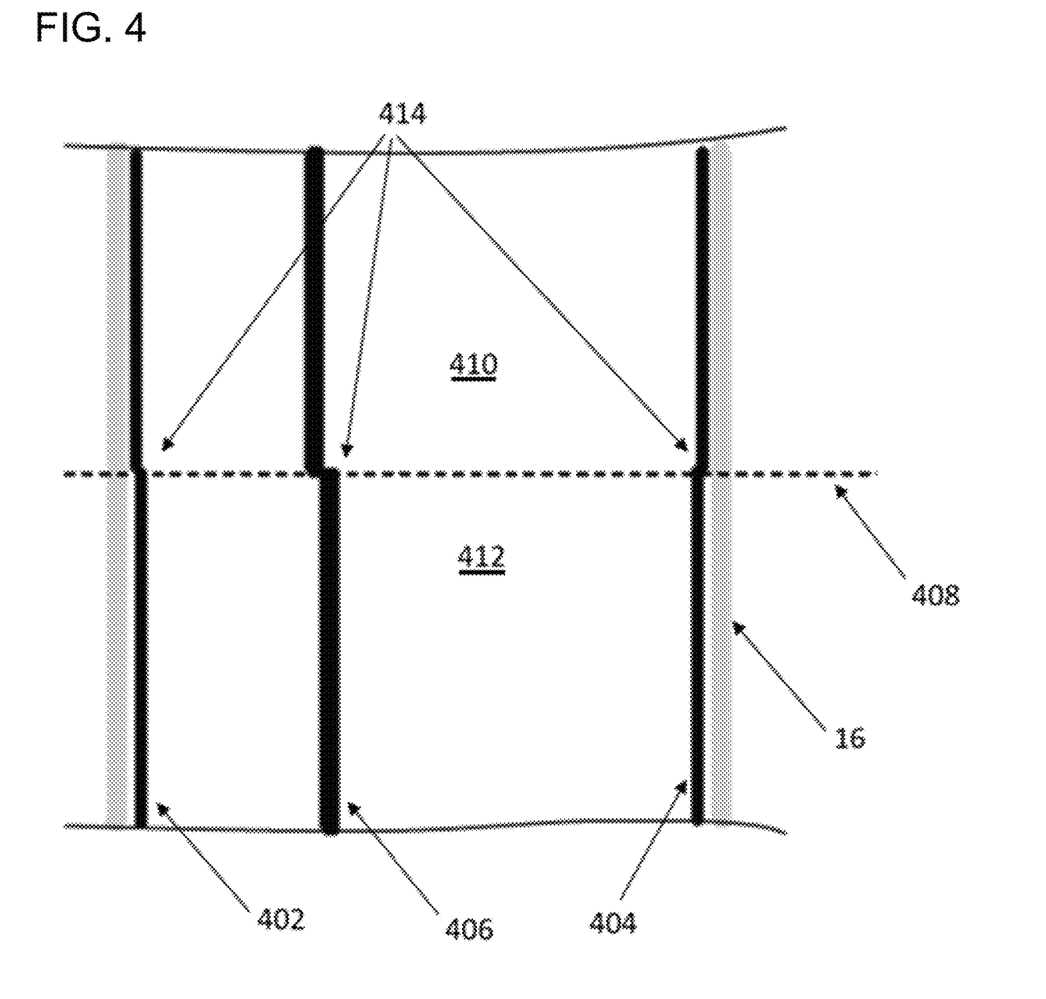
FIG. 4 illustrates an example shifting of vertical lines that may be provided on the backlight and which appear on the neck of the flask, according to the present disclosure.

FIG. 4 illustrates an example of how the computer 52 can analyze camera 50 images using refractive index according to some examples. In the illustrated example, a pair of vertical lines 402,404 appear at the edges of the neck 16 of the flask 12 and an additional one or more vertical lines 406 may be positioned behind the flask 12 (e.g., on the back light 32) to be visible through the neck 16. During the test, a vapor zone 412 is generated above the sample and below an air zone 410. The air zone 410 and vapor zone 412 are separated at a boundary 408 at which vapors do not extend beyond. When enough vapors are generated to form the vapor zone 412, the vertical lines 402,404,406 shift sideways or become misaligned at the boundary 408, as indicated by the illustrated misalignments 414. Stated differently, the vertical lines 402,404,406 within the air zone 410 do not align with the vertical lines 402,404,406 in the vapor zone 412. Identifying the evolution of misalignments 414 allows the current vapor level to be ascertained and detected, and movement (raising/lowering) of the vapor level may be determined as well. With this information, one may detect the vapor/air borderline in the flask neck 16 for samples with very low or non-forming visible condensation reflux on the walls of the flask 12.

As to the arrival of the vapors in the arm 23 of the flask 12 towards the condenser tube 22, the computer 52 may detect variation between the images in the area of the side arm 23 of the flask 12.

FIG. 1 illustrates an example where the camera 50 is positioned to continuously monitor the liquid sample 38.

However, as shown in FIG. 1, the camera 50 is typically positioned and oriented to focus on the entirety of the flask 12 (i.e., the camera 50 is positioned to monitor the entire height of the flask 12 rather than being so closely positioned relative to the sample such that portions of the flask 12 are outside the field of view or observation window 80 of the camera 50) and continuously feeds that image data/information to the computer 52. Thus, the camera 50 may be provided with a wide angle lens and appropriately aimed to capture (record) an image (or video) of the entire flask 12. The entire flask including the liquid sample 38 within the lower rounded portion 14 of the distillation flask 12 and the neck portion 16 of the flask 12 where vapors are formed. In this manner, the entire flask 12, may be within the field of view 31 of the camera 50. In the illustrated example of FIG. 1, the camera 50 is supported to be aligned with a window 31 of the housing 30. The housing 30 may be in the form of a chimney, and may have the window 31 formed in one of the walls thereof. Preferably, the camera 50 is positioned behind the window 31 to view the entire distillation flask 12 through the window 31. In this manner, the camera 50 is protected from heat radiated by the heating element 26 and/or fire incidents that may occur during testing within the chimney.

The image analysis system of the testing apparatus may further be able to detect an abnormally situation during the distillation process, for example a smoke formation in the flask or accidental flask breakage, and activate available security means like an alarm.

Optionally, the testing apparatus has a fire detection and extinguishing system, wherein the computer 52 ascertains if a fire event is occurring within the chimney and causes activation of fire extinguishers within the chimney to put out the fire. The fire detection and extinguishing system may also include a heat sensor, temperature sensor and/or smoke sensor (not shown) that communicates with the computer 52 to send data such that the computer 52 may ascertain if the fire event is occurring within the chimney (housing 30).

Also, the above-discussed back light 32 may be provided within the housing 30, behind the flask 12 and opposite the camera 50. As shown, the back light 32 may positioned behind the flask 12, such that the flask 12 is in between the window 31 and the backlight 32 so as to illuminate the flask 12 for monitoring by the camera 50. However, the backlight may be provided elsewhere within the housing 30 and/or additional backlights may be provided elsewhere within the housing 30 in addition to as shown in the FIG. 1.

Various types of cameras may be used. The camera 50 may be a digital camera comprising a photo detecting charge-coupled device (CCD). However, the camera 50 may be differently configured. In one example, the camera 50 is a camera with a complementary metal oxide semiconductor (CMOS) sensor, but other technology may be used. In some examples, the camera 50 has wide angle lens and/or a lens with an infrared (IR) filter. In some examples, two or more cameras may be used, for example, with one or more additional cameras focusing on particular aspects of the test apparatus, such as a portion of the distillation flask or on the sample, etc.

Figure 3:
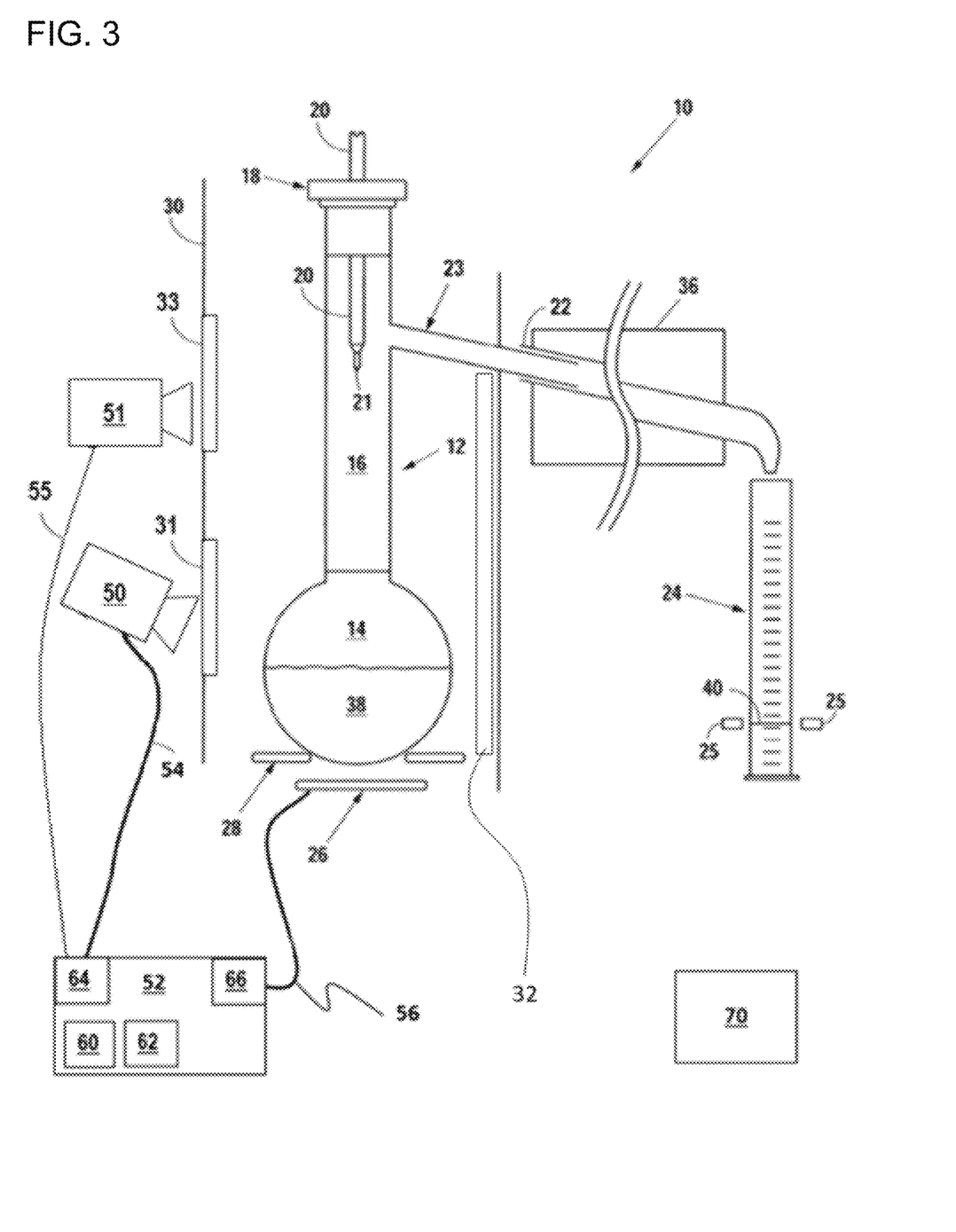
FIG. 3 illustrates an alternate schematic of an example distillation test assembly with two cameras, according to the present disclosure.

FIG. 3 illustrates an alternate schematic of an example distillation test assembly as in FIG. 1 modified to have an second (additional) camera 51. The second camera 51 may communicate with the computer 52 wirelessly or via a wired connection (e.g., an Ethernet cable 55) to one or more data/signal inputs 64. The second camera 51 observes the flask neck 16 through a window 33. Both of the cameras 50, 51 may be oriented horizontal, as shown in FIG. 3, or both may be tilted at some angle to focus on a portion of the flask 12, or combinations thereof. In FIG. 3, the first camera 50 is tilted and the second camera 51 is horizontal. However, if desired the second camera 51 may instead be tilted and/or the first camera 50 may instead be horizontal.

Thus, as described herein, the presently disclosed subject matter works by observing the visual effects of heating applied on the sample 38, thereby mimicking manual performance of the test. This makes it possible to detect the first reactions of the sample 38 to heating, earlier than the IR sensor method, and therefore allows the computer to adjust the heating earlier and to avoid falling into the "too late" case as may occur in IR sensor system disclosed by U.S. Pat. No. 10,363,495 (the '495 patent). The presently disclosed subject matter depends much less on the quality of the heat exchange between the heating element 26 and the flask 12 because the important information to know is whether to increase or decrease the heating power. The camera 50 also makes it possible to follow the rise of vapors in the neck 16 of the flask 12, which is not the case devices equipped with an IR sensor such as the device described in the '495 patent.

The use of a camera and the analysis of images, is typically not based on any database. The system works by observing the visual effects of heating on the sample, as an operator did (and sometimes still does) manually.

The computer 52 controls the heating element 26 according to the analysis of the images of the camera 50. The computer 52 is programmed to analyze images of the sample 38 as the heating element 26 heats the sample 38. Such image analysis help to regulate the rate of distillation throughout the test (i.e., in ml/min). In particular, the computer 52 can analyze images of the sample 38 as observed by the camera 50 during different phases of the test for appearance of ripple in surface of the liquid sample 38 due to the presence of hot liquid flows moving in the flask 12, appearance of bubbles on the interior walls of the distillation flask 12, agitation of the liquid surface of the sample 38 within the flask 12, increased level of the sample 38 due to dilation, rise of vapors and reflux due to condensation on the internal walls of the flask 12, and/or arrival of the vapors in the arm of the flask towards the condenser tube 22, etc. For example, during the test phase and after 5 ml of condensate has been recovered in the receiver 24, the computer 52 may measure the distillation speed (i.e., flowrate (ml/min) of condensate collecting into the receiver 24) via sensors 25, and based on this measure the computer 52 may control heat output of the heating element 26 applied to the distillation flask 12 and sample 38 therein to maintain the distillation seed within defined limits.

Many petroleum products such as gasoline, kerosene, diesel, etc. are mixture of hydrocarbons; they are not composed of single chemical molecules, unlike products like acetone or toluene which are pure. For mixed products the vapor temperatures increase as the distillation progresses, with the "lightest" compounds being evaporated at the start of the test and the "heaviest" compounds, required more heat for evaporation, being evaporated at the end of the test. Usually, the compounds evaporate one after the other creating gradually increasing temperature curve versus % recovered. However, with the advent of new compounds and biofuels, the test operator is increasingly being presented with a sample which present "a hole" in the smooth progress of evaporation, due to significant difference in boiling point of two neighbors compounds. It happened when "lightest" compound has been evaporated, but to boil off the next compound a significant increase in heating power is required. During this time, called "hesitation point" there is no more (or less) production of vapors and the speed of distillation slows down. The operator or automated distillation system should anticipate it and promptly increase the heat of the flask in order to maintain the target distillation speed. However, if the reaction of heating regulation to a measured decrease in distillation speed would occur too late, as the distillation speed would already be outside the parameters set by the standards, the distillation test is failed and needs to be repeated again with fresh portion of liquid sample. The present invention offers a solution to avoid that.

While the distillation is in progress at the stabilized speed, the reflux ring (or vapors) may stabilize slightly above the flask arm 23. The camera 50 monitors such reflux ring (or vapors) and the computer 52 may detect a fall (or lowering) in the position of the reflux ring, and then adjust heating of the heating element 26 (in response to detecting such fall or lowering of the ring) anticipating early enough potential decrease in the condensate flow, and, thus, ensuring that distillation speed (ml/min) stays within the range defined by the standard.

Method for Using the Device of the Present Invention

Figure 2:
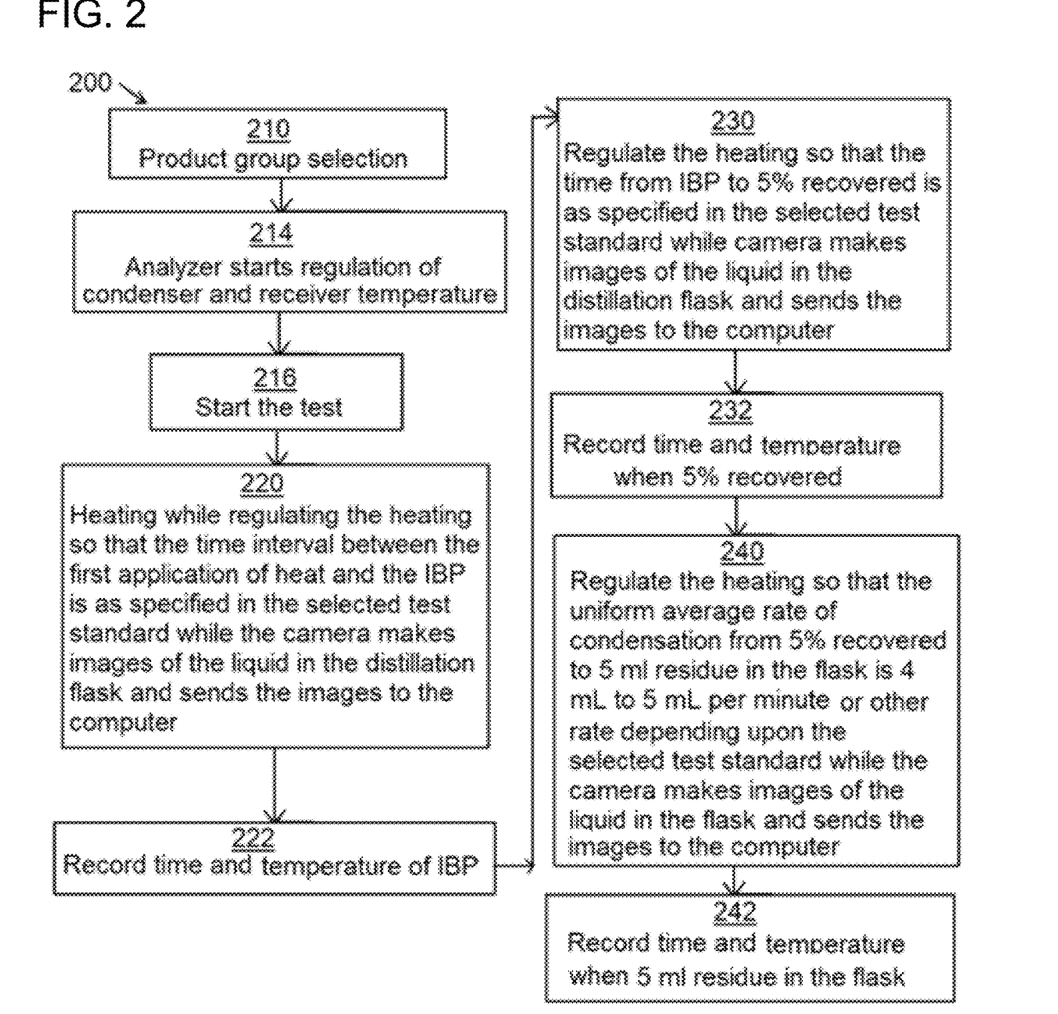
FIG. 2 illustrates an example method according to the present disclosure.

Referring now to FIG. 2, flow chart 200 illustrates a distillation testing procedure of the present invention. The unknown liquid sample under test is prepared and placed in the distillation flask in accordance with the chosen distillation standard method (e.g., ASTM D86) and the distillation flask is installed in the distillation assembly. If desired, the distillation may occur automatically using an automatic analyzer. The test parameters (e.g., diameter of support plate for the distillation flask, the condenser and receiver temperatures, etc. . . . ) are set depending on the chosen distillation standard method and group of product selected. The group of products includes Groups 1-4 which group products based on their characteristics (e.g., distillate type, vapor pressure, expected IBP, etc. . . . ), as described in ASTM D86-20b.

Beginning with block 210, the user first makes a selection of the group of product to be analyzed. In block 214, the distillation assembly, e.g., automatic analyzer, commences the regulation of the condenser and receiver temperatures. Now that the sample has been prepared and the parameters have been set, the distillation process may start. The testing or analysis starts, as depicted in block 216. This may be by pushing a "Start" button or other similar initiating trigger on the distillation assembly.

The distillation process comprises several stages. Referring to FIG. 1 and the process flow chart of FIG. 2, the liquid sample in the flask 12 is heated while regulating the heating so that the time interval between the first application of heat and the IBP (initial boiling point) is as specified in the selected test standard, as shown in block 220, while the camera is taking images of the liquid in the distillation flask and sending the images to the computer for analysis. The analysis is beneficial, as discussed above, to provide early detection of the IBP as well as regulate the heating between the first application of heat and the IBP (initial boiling point).

When the IBP is determined the time and temperature of the IBP is recorded, as shown in block 222.

Then the liquid sample in the flask is heated while regulating the heating so that the time from the IBP to 5% recovered is as specified in the selected test standard, as shown in block 230, while the camera is taking images of the liquid in the distillation flask and sending the images to the computer for analysis. The analysis is beneficial, as discussed above, to regulate the heating from the IBP to 5% recovered.

When 5% recovered is determined the time and temperature of 5% recovered is recorded, as shown in block 232.

Then the liquid sample in the flask is heated while regulating the heating so that the time from 5% recovered to 5 mL residue is 4 ml to 5 mL per minute or as otherwise specified in the selected test standard, as shown in block 240, while the camera 50 is taking images of the liquid in the distillation flask 12 and sending the images to the computer 52 for analysis. The analysis is beneficial, as discussed above, to regulate the heating from 5% recovered to 5 mL residue. As mentioned above, the computer 52 analyzes image data recited from the camera 50 for phenomena occurring to the sample 38 in the flask 12 to control the heating element 26 based on such occurrences of phenomena to thereby maintain distillation speed within testing parameters (e.g., computer 52 analyzes camera 50 images to identify reflux rings/vapors in the neck 16 of the flask 12 and regulate heating to avoid too low distillation speed).

When 5 mL residue is determined the time and temperature of 5 mL residue is recorded, as shown in block 242.

As heating of the liquid sample 38 continues, the camera 50 is continuously monitoring the liquid in the distillation flask 12. This assists in the evaluation of the progress of the heating and boiling. If no indication of sufficient heating or boiling is observed by the camera 50 and computer 52, the heating of the liquid sample continues or increases. If, however, the start of boiling is observed and the images from the camera 50 as analyzed by the computer 52 show heating and boiling are at rates above a suitable rate, the heating of the liquid sample decreases. However, application of too much heating to the flask 12 when there is little or no sample 38 remaining therein to evaporate may weaken the glass of the flask 12 and cause failure (breakage) of the flask 12 during subsequent test. Thus the computer 52 may analyze image data from the camera 50 to determine whether any sample 38 remains in the flask 12 so as to determine whether any further (or additional) heating should be applied. For example, when performing the test on certain types of samples (e.g., type 4 samples), surplus power may be added to evaporate some of the heaviest residues remaining in the flask 12, and the camera 50 and computer 52 may be programmed so as to determine whether such surplus power should be added and, if added, when it should be turned off.

Also after achieving the IBP, a determination of whether the volume of distillate collected is greater than the control volume is performed. If not, then the heating of the liquid sample is continually adjusted. If the volume does exceed the control volume then the test proceeds to the later stages of blocks 230 and 240.

For the later stages such as blocks 230 and 240, the heating control can be switched to a PID (proportional-integral-derivative) control algorithm stored in the computer or similar convention. If desired this control may be augmented by the camera continuing to take images of the liquid in the distillation flask and the analysis by the computer of these images to indicate if the boiling is progressing properly.

According to the standards (e.g., ASTM D86), there are two standard limitations of time: (1) the time from the start of test (application of heating) to the observation of the first drop of distillate in the collecting flask (i.e., the IBP), and (2) the time from the IBP to the 5% distillation point (i.e., 5% of the initial volume of sample collected as distillate). The present invention improves both.

Figure 5:
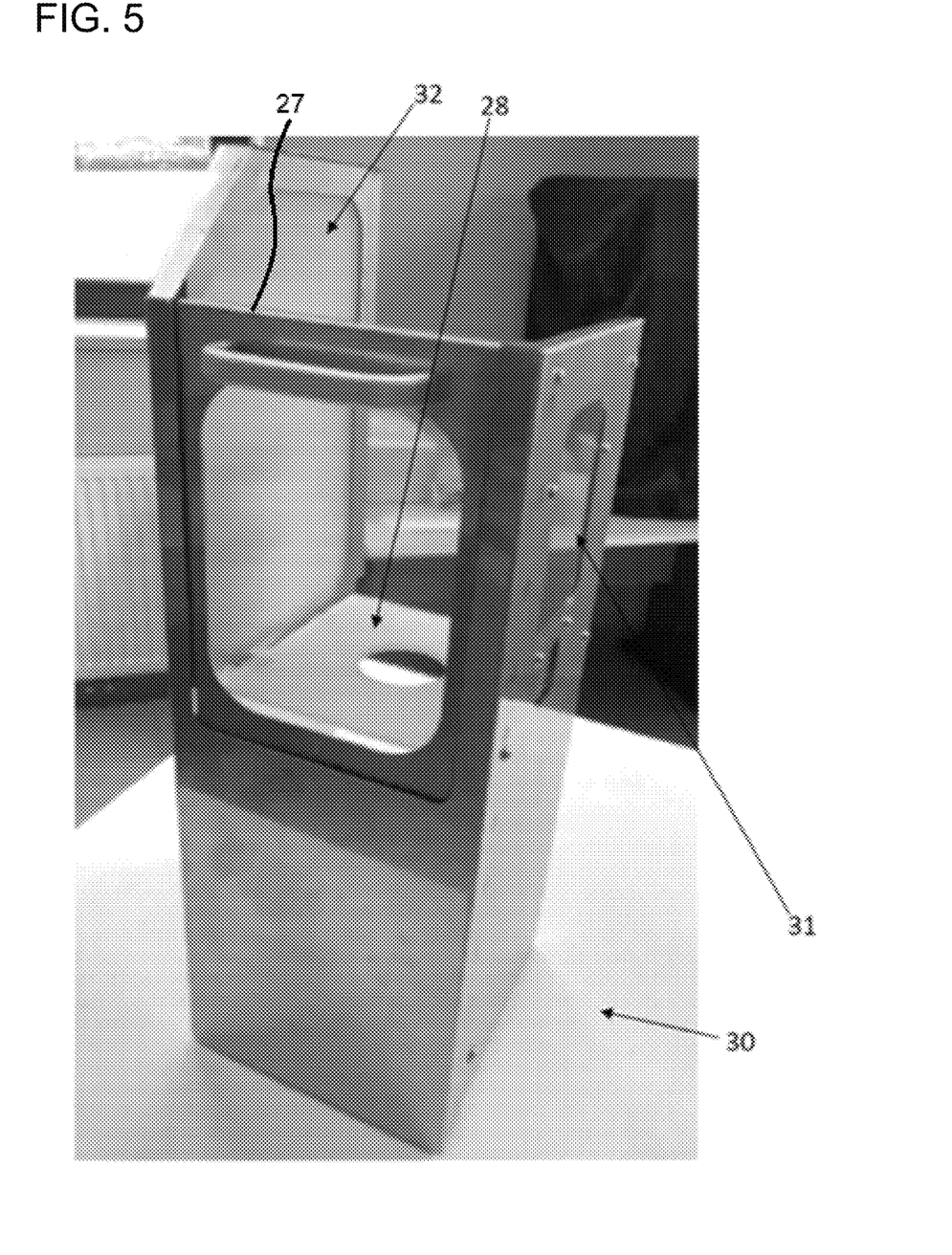
FIG. 5 illustrates an exemplary housing utilizable with the distillation test assembly of FIG. 1.

FIG. 5 illustrates an example of the housing 30 for the present invention As illustrated, the housing 30 comprises a plurality of sidewalls which define an interior within which the flask 12 (see FIG. 6) may be disposed. Here, the housing 30 includes a first wall on which the window 31 is provided and an opposite wall on which the backlight 32 is provided and, in the example, the backlight 32 forms the opposite wall. Here, the housing 30 is a multi-wall structure, and thus one or more additional walls are provided to define between the backlight wall and the camera window wall. One of those walls may be provided as a door (for example, moveable panel 27) which the operator may open and close to access the flask 12. In some examples, the housing 30 is a three wall enclosure and in other examples, the housing 30 is a four wall enclosure, etc.

Figure 6:
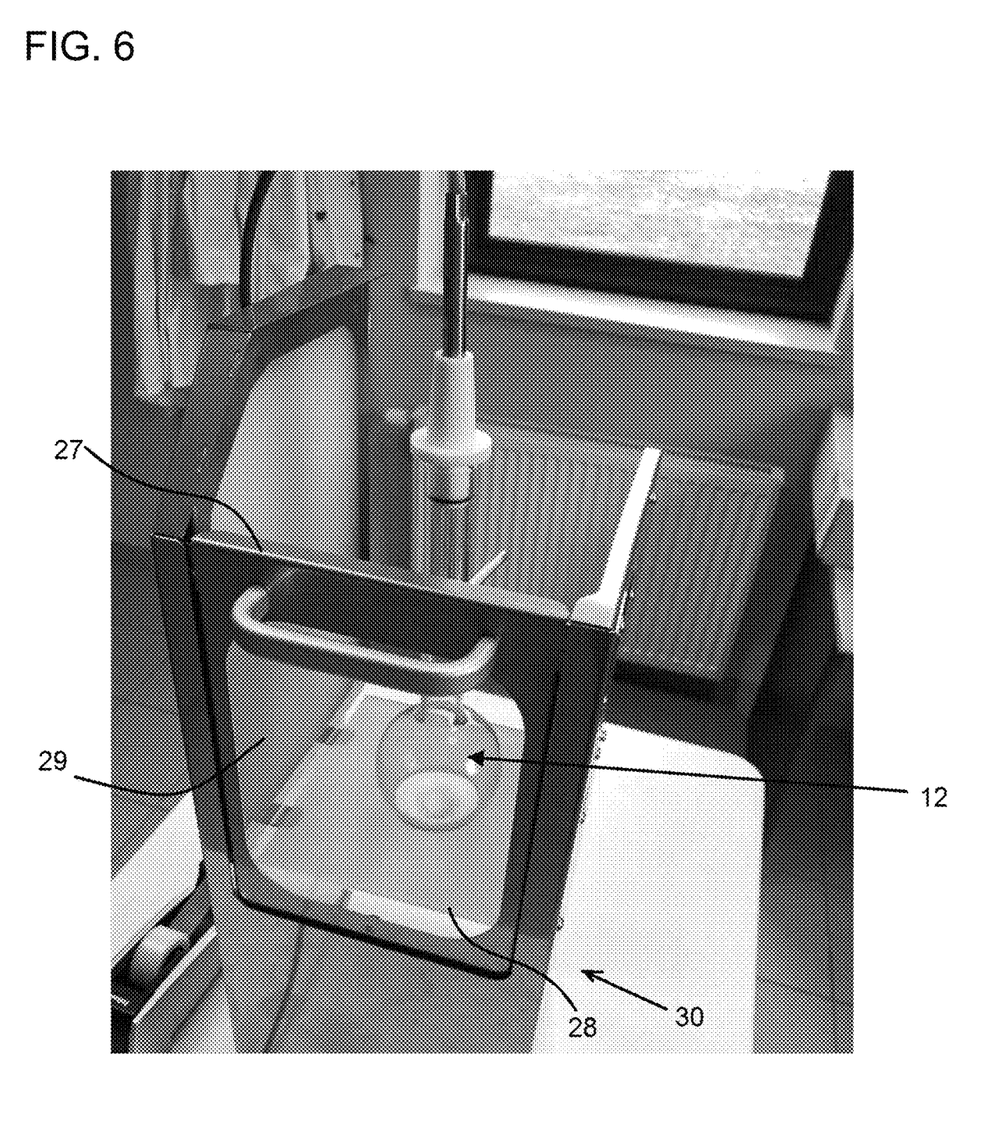
FIG. 6 illustrates the exemplary housing of FIG. 5 with a flask utilizable with the distillation test assembly of FIG. 1.
Figure 7:
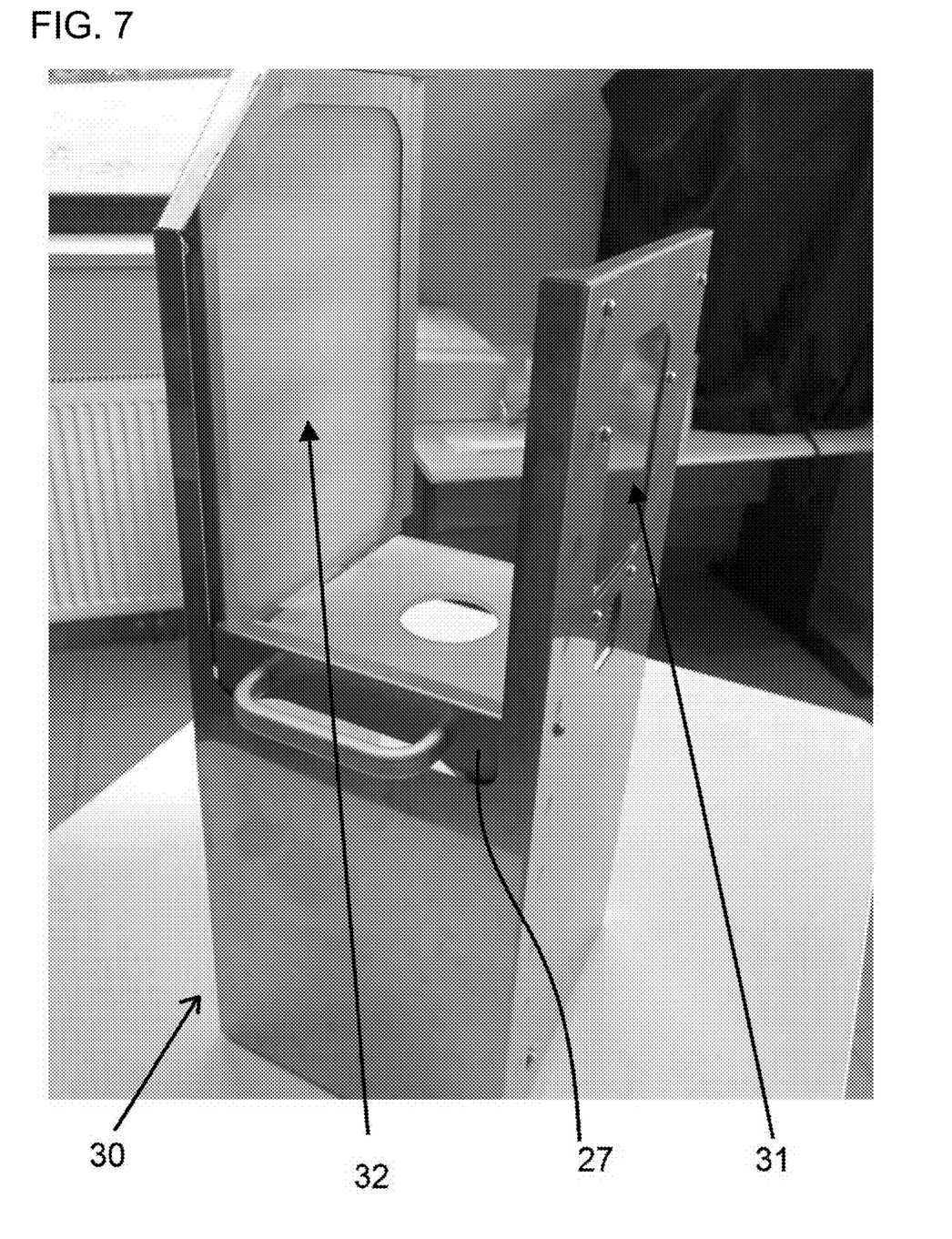
FIG. 7 shows another view of the exemplary housing of FIG. 5 with a moveable panel in a lower position.

FIG. 6 shows the housing 30 with the flask 12 in place on the base plate 28 and shows the moveable panel 27 with a window portion 29 in an upper position. FIG. 7 shows the housing 30 with the moveable panel 29 in a lower position.

CLAUSES OF THE INVENTION

The following clauses describe various aspects of the present invention.

Clause 1. A testing apparatus for distillation of a liquid sample at atmospheric pressure, the testing apparatus comprising:

a flask having a round bottom, a neck portion and a top opening;

a stopper for covering the top opening of the flask;

a heating element in thermal communication with the flask bottom for heating the flask;

a temperature sensor traversing the stopper;

a condenser connected to the flask at one end of the condenser;

a cooling source surrounding the condenser;

a receiver in communication with the condenser for receiving distillate from the condenser;

a sensor for monitoring of a level and/or amount of the distillate collected in the receiver during a distillation test, a camera positioned to monitor behavior of the liquid sample within the flask to obtain image data of the liquid sample, preferably of the liquid sample and vapors emitted from the liquid sample, during the distillation test, and an image analysis system to control the heating element based on analysis of the image data.

Clause 2. The testing apparatus of clause 1, wherein the image analysis system comprises a computer.

Clause 3. The testing apparatus of clause 2, wherein the computer analyzes the image data observed by the camera during different heating phases of a distillation test.

Clause 4. The testing apparatus of clause 1, further comprising a base plate for supporting the flask, the base plate having an aperture in the center thereof and positioned between the flask and the heating element.

Clause 5. The testing apparatus of clause 1, wherein the temperature detector traversing the stopper comprises a thermometer traversing said stopper, said thermometer having a tip extending below said condenser to locate said tip within said neck portion.

Clause 6. The testing apparatus of clause 1, wherein the condenser is removably attached at one end to said neck portion of said flask.

Clause 7. The testing apparatus of clause 1, wherein the camera or cameras can be equipped with wide angle lens and/or lens with an infrared (IR) filter.

Clause 8. The testing apparatus of clause 1, wherein the image analysis system comprises a backlight panel located behind the flask and opposite the camera.

Clause 9. The testing apparatus of clause 1, wherein the backlight panel comprises one or more vertical lines visible to the camera through the neck of the flask helping to detect reflux in the neck by variation in refractive index phenomena.

Clause 10. The testing apparatus of clause 1, wherein the image analysis system comprises a first digital camera and a second digital camera and a computer, wherein the first digital camera and the second digital camera are in communication with a computer, wherein the first digital camera is for monitoring a lower portion of the flask comprising the round bottom and the second digital camera is for monitoring an upper portion of the flask comprising the neck.

Clause 11. A method for automatic distillation of a liquid sample at atmospheric pressure using a testing apparatus of any preceding clause, preferably at strictly defined conditions by a standard test method (for example ASTM D86-20b), said method comprising the steps of:

selecting a group of products to be analyzed as the liquid sample;

regulating temperatures of the condenser and receiver;

introducing a predefined quantity of the liquid sample to the automatic distillation assembly flask;

initiating testing with an initiating trigger;

heating of the flask containing the liquid sample with the heating element;

monitoring behavior of the liquid sample within the flask with the camera to obtain the image data of the liquid sample, preferably of the liquid sample and vapors emitted from the liquid sample, during a distillation test;

analyzing the image data in the image analysis system;

detecting initial boiling of said liquid sample with the image analysis system;

measuring with the temperature sensor the temperature of vapors in the flask;

adjusting the heating by controlling the heating element based on the analyzing of the image data;

measuring a recovered volume of a distillate, produced from the liquid sample, that is received in the receiver; and stop heating when an end point of the distillation is reached.

Clause 12. The method of clause 11, further comprising the step of determining the initial boiling point of said liquid sample.

Clause 13. The method of clause 11, further comprising the step of determining the 5% distillation point of said liquid sample.

Clause 14. The method of clause 11, further comprising the step of determining the final boiling point of said liquid sample.

Clause 15. The method of clause 11, further comprising the step of determining the initial boiling point of said liquid sample, further comprising the step of determining the 5% distillation point of said liquid sample, further comprising the step of determining the final boiling point of said liquid sample.

Clause 16. The method of clause 11, wherein said image analysis system detects an abnormally situation during the distillation process, for example a smoke formation in the flask or accidental flask brakeage, and activate available security means like an alarm.

Therefore, the disclosed systems and methods are well adapted to attain the ends and advantages mentioned as well as those that are inherent therein. The particular embodiments disclosed above are illustrative only. The teachings of the present disclosure may be modified and practiced in different but equivalent manners apparent to those skilled in the art having the benefit of the teachings herein. Furthermore, no limitations are intended to the details of construction or design herein shown, other than as described in the claims below. It is evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

The terms "proximal" and "distal" are defined herein relative to a test operator. The term "proximal" refers to the position of an element closer to the test operator and the term "distal" refers to the position of an element further away from the test operator. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A testing apparatus for distillation of a liquid sample at atmospheric pressure, the testing apparatus comprising:
   a glass flask having a round bottom, a neck portion and a top opening;
   a stopper for covering the top opening of the glass flask;
   a heating element in thermal communication with the flaskround bottom for heating the glass flask;
   a temperature sensor traversing the stopper;
   a condenser connected to the flask at one end of the condenser;
   a cooling source surrounding the condenser;
   a receiver in communication with the condenser for receiving distillate from the condenser;
   a sensor for monitoring of a level and/or amount of the distillate collected in the receiver during a distillation test,
   a digital camera positioned to monitor behavior of the liquid sample within the glass flask in visible spectrum to obtain successive images of the liquid sample and vapors emitted from the liquid sample, during the distillation test,
   a backlight panel located behind the glass flask and opposite the camera; and
   an image analyzer to automatically control the heating element based on analysis of the successive images fed by the digital camera.

2. The testing apparatus of claim 1, wherein the image analyzer comprises a computer.

3. The testing apparatus of claim 2, wherein the computer analyzes the images observed by the camera at different heating regulation stages during the distillation test.

4. The testing apparatus of claim 1, further comprising a base plate for supporting the glass flask, the base plate having an aperture a center thereof and positioned between the glass flask and the heating element.

5. The testing apparatus of claim 1, wherein the temperature sensor traversing the stopper comprises a thermometer traversing said stopper, said thermometer having a sensing tip extending below said condenser and capable of measuring a temperature of vapors within said neck portion.

6. The testing apparatus of claim 1, wherein the condenser is removably attached at one end to said neck portion of said glass flask.

7. The testing apparatus of claim 1, wherein the digital camera is equipped with a wide angle lens with an infrared (IR) filter.

8. The testing apparatus of claim 1, wherein the backlight panel comprises one or more vertical lines visible to the digital camera through the neck of the glass flask and the image analyzer detects reflux in the neck by variation in refractive index phenomena based on the one or more vertical lines.

9. The testing apparatus of claim 1, wherein the camera is a first digital camera and the image analyzer comprises the first digital camera and a second digital camera, wherein the first digital camera and the second digital camera are in communication with the computer, wherein the first digital camera is for monitoring a lower portion of the glass flask comprising the round bottom and the second digital camera is for monitoring an upper portion of the glass flask comprising the neck.

10. The testing apparatus of claim 1, wherein the testing apparatus does not include an infrared sensor and the digital camera is equipped with a wide angle lens.

11. A method for distillation of a liquid sample at atmospheric pressure using a testing apparatus, at defined conditions by a standard test method, said method comprising steps of:
   selecting a group of products to be analyzed as the liquid sample;
   regulating temperatures of a condenser and receiver;
   introducing a predefined quantity of the liquid sample to a glass flask;
   initiating testing with an initiating trigger;
   heating the glass flask containing the liquid sample with a heating element;
   monitoring behavior of the liquid sample within the glass flask with a digital camera to obtain successive images in visible spectrum of the liquid sample and vapors emitted from the liquid sample, during the distillation test,
   analyzing the images fed by the digital camera with an image analyzer;
   automatically detecting initial boiling of said liquid sample with the image analyzer;
   measuring with a temperature sensor a temperature of vapors in the glass flask;
   measuring a recovered volume of a distillate, produced from the liquid sample, that is received in the receiver;
   adjusting the heating element based on the analyzing of the images to control the distillation within the defined conditions by the standard test method; and
   stopping heating when an end point of the distillation test is reached.

12. The method of claim 11, further comprising a step of determining an initial boiling point of said liquid sample.

13. The method of claim 11, further comprising a step of determining a 5% distillation point of said liquid sample.

14. The method of claim 11, further comprising a step of determining a final boiling point of said liquid sample.

15. The method of claim 11, further comprising a step of determining an initial boiling point of said liquid sample, further comprising a step of determining a 5% distillation point of said liquid sample, further comprising a step of determining a final boiling point of said liquid sample.

16. The method of claim 11, wherein said image analyzer detects an abnormal situation during the distillation test and in response, activates available security means.

17. The method of claim 11, wherein the image analyzer adjusts the heating element by adjusting power provided to the heating element to align with the defined conditions of the standard test method by monitoring the position of reflux in a neck of the glass flask based on missaliment of one or more vertical lines on the backlight panel in the successive images caused by variation in refractive index phenomena.

18. The method of claim 11, wherein the distillation test occurs at the defined conditions by a standard test ASTM D86.

19. The method of claim 11, further comprising detecting, by said image analyzer, a smoke formation in the glass flask or an accidental glass flask brakeage during the distillation test, and in response activates an available alarm.

* * * * *